(12) United States Patent
Star et al.

(10) Patent No.: US 12,717,111 B1
(45) Date of Patent: Aug. 25, 2026

(54) OPTICAL PROCESS LENS OF A TRANSPARENT CERAMIC

(71) Applicant: LJ Star, Incorporated, Twinsburg, OH (US)

(72) Inventors: David Star, Pepper Pike, OH (US); Aarash Navabi, Walpole, MA (US); Jacob Andrew Ramey, Akron, OH (US)

(73) Assignee: LJ Star, Incorporated, Twinsburg, OH (US)

( * ) Notice: Subject to any disclaimer, the term of this patent is extended or adjusted under 35 U.S.C. 154(b) by 729 days.

(21) Appl. No.: 18/066,046

(22) Filed: Dec. 14, 2022

Related U.S. Application Data

(60) Provisional application No. 63/289,442, filed on Dec. 14, 2021.

(51) Int. Cl.
*G02B 7/00* (2021.01)
*G02B 7/02* (2021.01)

(52) U.S. Cl.
CPC ............. *G02B 7/007* (2013.01); *G02B 7/022* (2013.01)

(58) Field of Classification Search
CPC ...... G02B 7/007; G02B 7/022; C03C 10/0045
USPC ................ 359/830, 829, 827, 822, 819, 642
See application file for complete search history.

(56) References Cited

U.S. PATENT DOCUMENTS

| | | | | |
|---|---|---|---|---|
| 4,983,555 A | | 1/1991 | Roy et al. | |
| 5,974,877 A | * | 11/1999 | Burgess, Jr. | B01J 3/004 220/663 |
| 6,212,989 B1 | * | 4/2001 | Beyer | F41H 5/263 220/240 |
| 10,875,812 B2 | * | 12/2020 | Haven | B28B 11/005 |
| 2010/0014152 A1 | * | 1/2010 | Robinson | G02B 7/022 359/350 |
| 2020/0318738 A1 | * | 10/2020 | Deeks | F16J 15/0806 |
| 2021/0095711 A1 | * | 4/2021 | Pinney | F16B 43/001 |

FOREIGN PATENT DOCUMENTS

WO WO-2021042117 A1 * 3/2021 ........ H01J 37/32798

OTHER PUBLICATIONS

Kim, Woohong, et al. “Ceramic windows and gain media for high-energy lasers.” Optical Engineering 52.2 (2013): 021003-021003. (Year: 2013).*

American Society of Mechanical Engineers (ASME) B 18.2. 1. “Square, hex, heavy hex, and askew head bolts and hex, heavy hex, hex flange, lobed head, and lag screws (inch series).” New York, NY: ASME, 2012 (Year: 2012).*

Krell, Andreas, Guenter M. Baur, and Claus Dahne. “Transparent sintered sub-um Al2O3 with IR transmissivity equal to sapphire.” Window and Dome Technologies VIII. vol. 5078. SPIE, 2003 (Year: 2003).*

* cited by examiner

*Primary Examiner* — Thomas K Pham
*Assistant Examiner* — Justin W. Hustoft
(74) *Attorney, Agent, or Firm* — Sisson & Banyas, Attorneys at Law, LLC; Edwin A. Sisson

(57) ABSTRACT

An optical process lens of transparent ceramic is disclosed. The transparent ceramic may be used as part of an optical process lens assembly to replace glass with or without a metal frame or fused metal component.

3 Claims, 9 Drawing Sheets

205
200
204
202
225
250
250
225
203
215
201
1000

OPTICAL PROCESS LENS OF A TRANSPARENT CERAMIC

CROSS REFERENCES AND PRIORITIES

This application claims priority from U.S. Provisional Application No. 63/289,442 filed 14 Dec. 2022, the teachings of which are incorporated by reference herein in their entirety.

BACKGROUND

Today's state of the art industrial optical process lenses are made from special treated glass types for various conditions. Because they use glass as the transparent material, these are called sight glasses, a type of industrial optical process lens.

These special treated glasses are often not suitable for environments such as high pressures, high or low temperatures at extreme pressures or reactivity of some kind with the process media.

SUMMARY

This specification discloses an optical process lens comprising a transparent ceramic member having a first side, a second side opposite the first side, and a perimeter. The optical process lens may have a configuration to be attached to at least one piece of process equipment without the use of a frame or fused metal.

This transparent ceramic member may be comprised of a ceramic selected from the group consisting of crystals of Aluminum-oxynitride, Magnesium-oxynitride, $Al_2O_3$ and MgO.

It is further disclosed that the transparent ceramic member may allow at least 50% of a light spectrum to pass through it from the first side and through the second side and the light spectrum may be selected from the group consisting of visible light (400-700 nm), the infrared spectrum (greater than 700 nm to 1 mm), and the ultraviolet spectrum (10 nm to less than 400 nm).

It is further disclosed that there may be at least one groove on at least one of the first side or the second side of the transparent ceramic member.

The optical process lens can be a flat disk, with a configuration comprising at least four holes passing through the first side and the second side.

The optical process lens can be a disk having a circumference with the configuration comprising a sloped surface (chamfer) tracing the circumference on the first side or the second side to allow for a ring clamp to be applied to the sloped surface.

It is further disclosed that the optical process lens may be in the shape of a tube with a process hole passing through a first tube end and a second tube end where the first side is on the outside of the tube and the second side is on the inside of the tube and the first end and second end have the configuration of a flange that is perpendicular to the hole. This optical process lens may have at least four attachment holes or a sloped surface around the perimeter on the first side allowing for a ring clamp to be applied to the sloped surface.

It is also disclosed that the configuration of the optical process lens may comprise a shape of a bolt with a first bolt portion and a second bolt portion wherein the first bolt portion is a threaded rod, and the second bolt portion is a polygon shaped head with the polygon perpendicular to the threaded rod.

It is also disclosed that the optical process lens may be in the shape of a rectangle with one or two of the shorter sides optionally rounded An alternative optical process lens is disclosed wherein the optical process lens comprises a transparent ceramic member having a first side, a second side opposite the first side, and a perimeter; with the first side or the second side of the transparent ceramic member abuts a transparent member which is not a transparent ceramic. This is known as a sandwich configuration.

DETAILED DESCRIPTION

Figure 1:
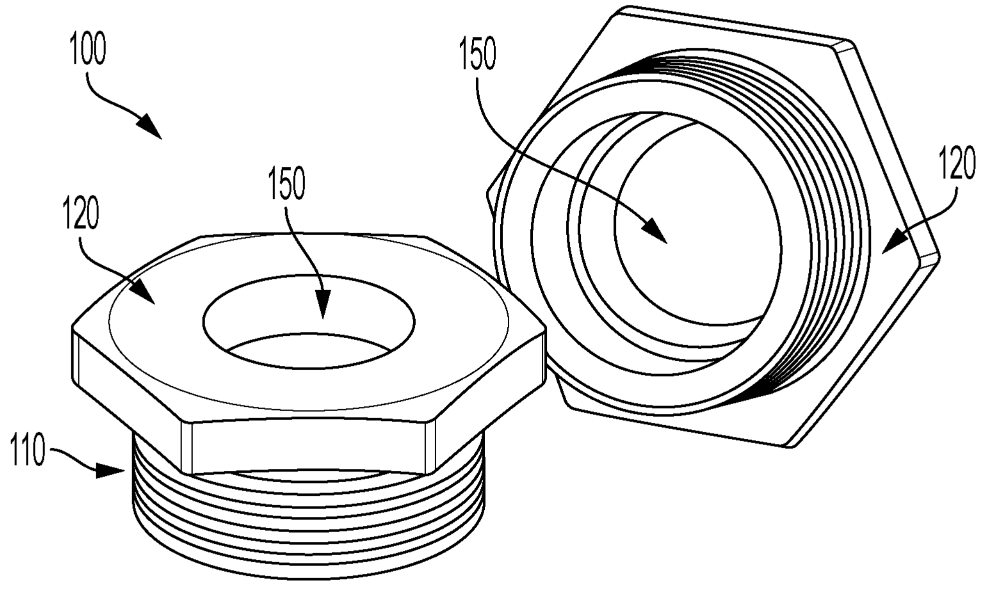
FIG. 1 depicts a prior art optical process lens assembly.

The following numbers indicate the parts of the figures shown as follows:

100 is the prior art optical lens assembly shown in FIG. 1.

110 are the threads of the prior art optical lens assembly shown in FIG. 1.

120 is the head of the prior art optical lens assembly shown in FIG. 1.

150 is the optical lens of the prior art optical lens assembly shown in FIG. 1.

Figures 2A, 2B:
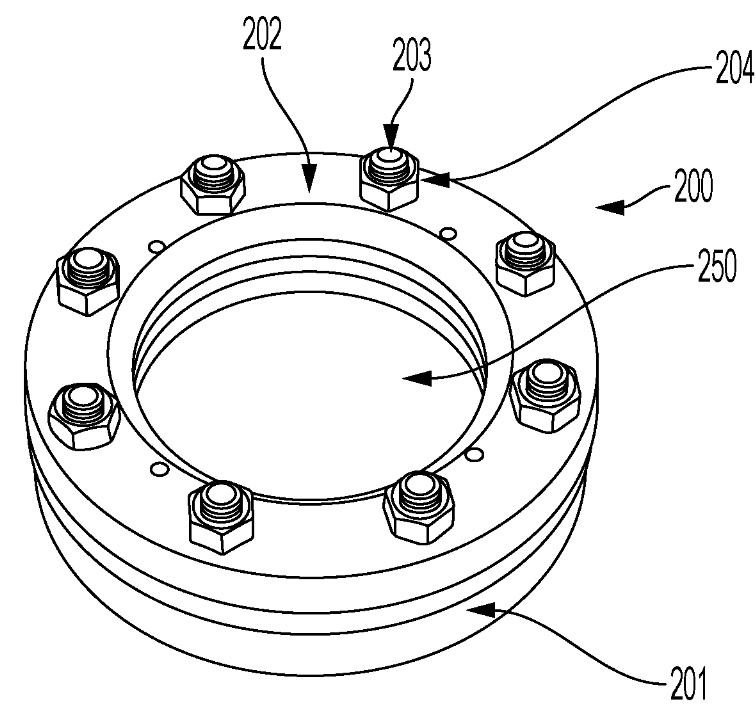
FIG. 2A depicts a prior art optical process lens assembly.
FIG. 2B depicts an exploded view of a prior art optical process lens assembly.

200 is the prior art optical lens assembly shown in FIG. 2A and FIG. 2B.

201 is the base of the prior art optical lens assembly shown in FIG. 2A and FIG. 2B.

202 is the upper frame of the prior art optical lens assembly shown in FIG. 2A and FIG. 2B.

203 are the bolts of the prior art optical lens assembly shown in FIG. 2A and FIG. 2B.

204 are the nuts of the prior art optical lens assembly shown in FIG. 2A and FIG. 2B.

205 are the holes of the prior art optical lens assembly shown in FIG. 2A and FIG. 2B.

225 is the gasket of the prior art optical lens assembly shown in FIG. 2A and FIG. 2B.

250 is the optical lens of the optical lens assembly shown in FIG. 2A and FIG. 2B.

1000 is the wall of the tank which has been welded to the base 201 of the optical lens assembly shown in FIG. 2A and FIG. 2B.

Figures 3A, 3B, 3C:
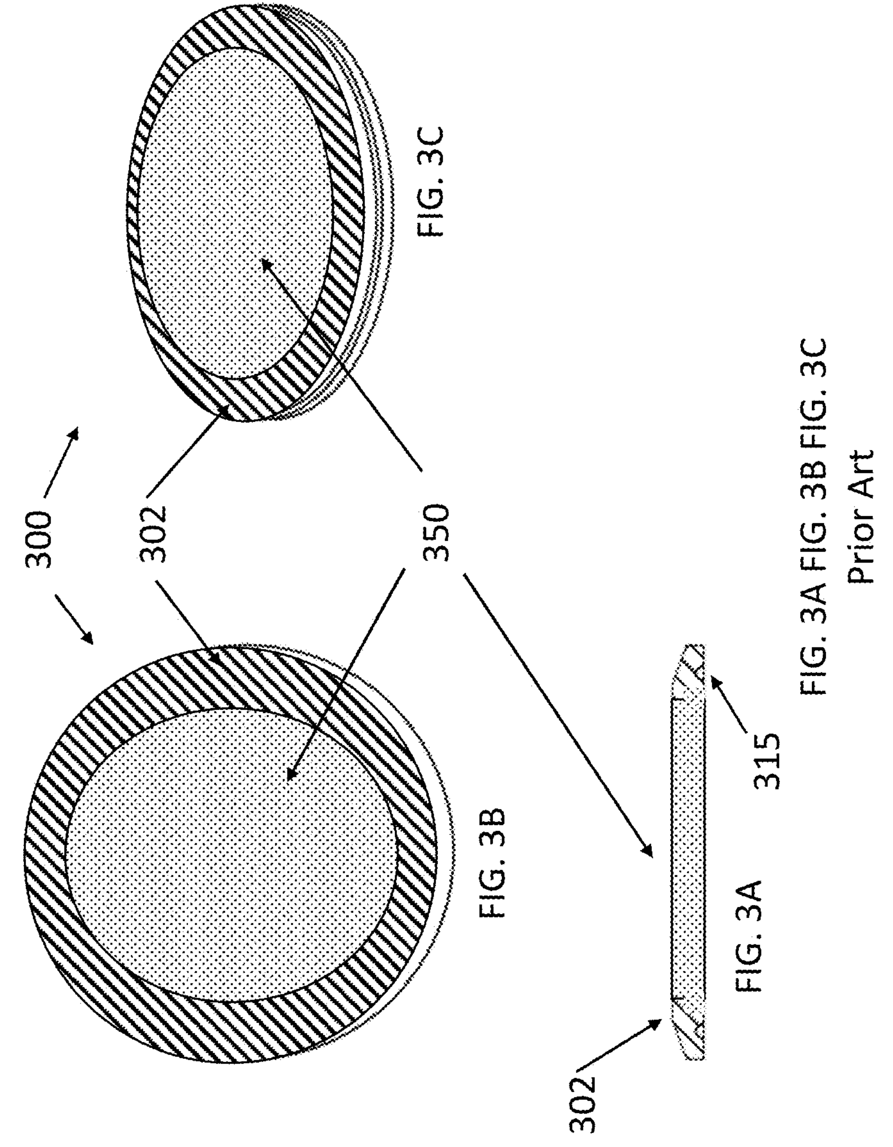
FIG. 3A depicts a cutaway view of a prior art optical process lens assembly.
FIG. 3B depicts a top view of a prior art optical process lens assembly.
FIG. 3C depicts a perspective view of a prior art optical process lens assembly.

300 is a prior art optical lens assembly shown in FIG. 3A, FIG. 3B and FIG. 3C.

302 is the fused metal part of the prior art optical lens assembly shown in FIG. 3A, FIG. 3B and FIG. 3C.

315 is a groove for a gasket on the prior art optical lens assembly shown in FIG. 3A, FIG. 3B and FIG. 3C.

350 is the optical lens of the prior art optical lens assembly shown in FIG. 3A, FIG. 3B and FIG. 3C.

Figure 4A:
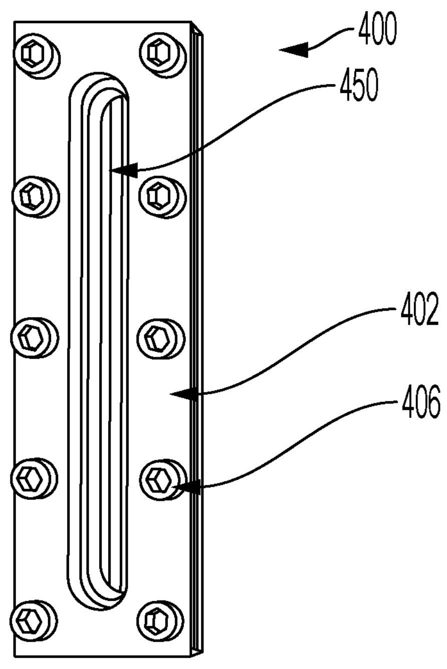
FIG. 4A depicts a prior art optical process lens assembly.
Figure 4B:
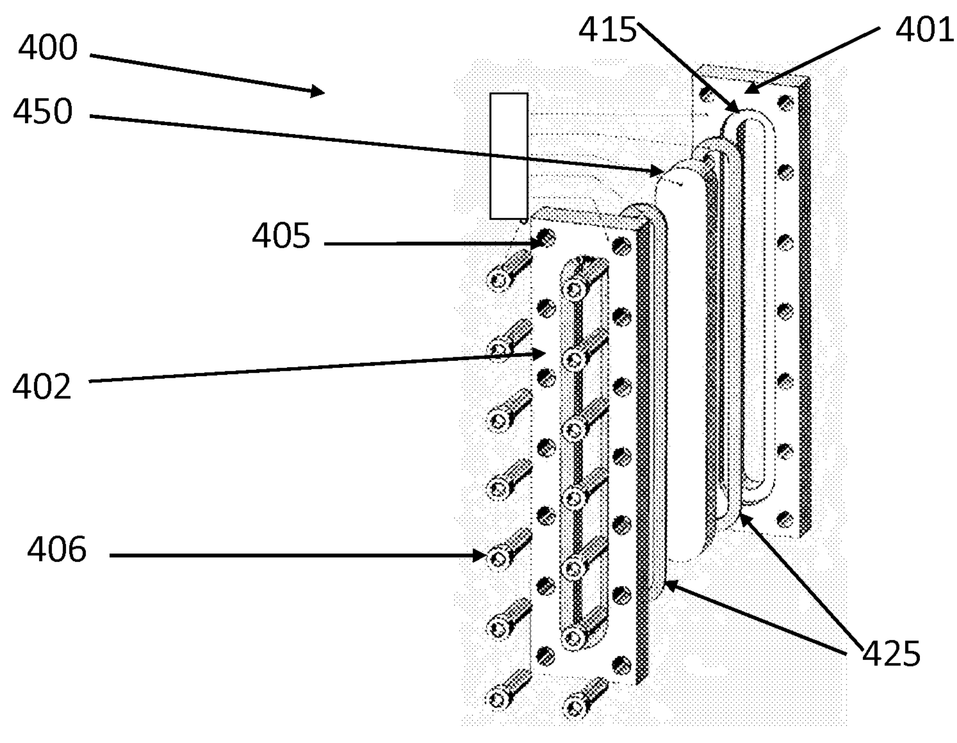
FIG. 4B depicts a prior art optical process lens assembly.

400 is the prior art optical lens assembly shown in FIG. 4A and FIG. 4B.

401 is the base of the prior art optical lens assembly shown in FIG. 4A and FIG. 4B.

402 is the upper frame of the prior art optical lens assembly shown in FIG. 4A and FIG. 4B.

405 are the holes of the prior art optical lens assembly shown in FIG. 4A and FIG. 4B.

406 are the bolts of the prior art optical lens assembly shown in FIG. 4A and FIG. 4B.

415 are the gasket cavities of the prior art optical lens assembly shown in FIG. 4A and FIG. 4B.

425 are the gaskets of the prior art optical lens assembly shown in FIG. 4A and FIG. 4B.

450 is the optical lens of the prior art optical lens assembly shown in FIG. 4A and FIG. 4B.

Figures 5A, 5B, 5C:
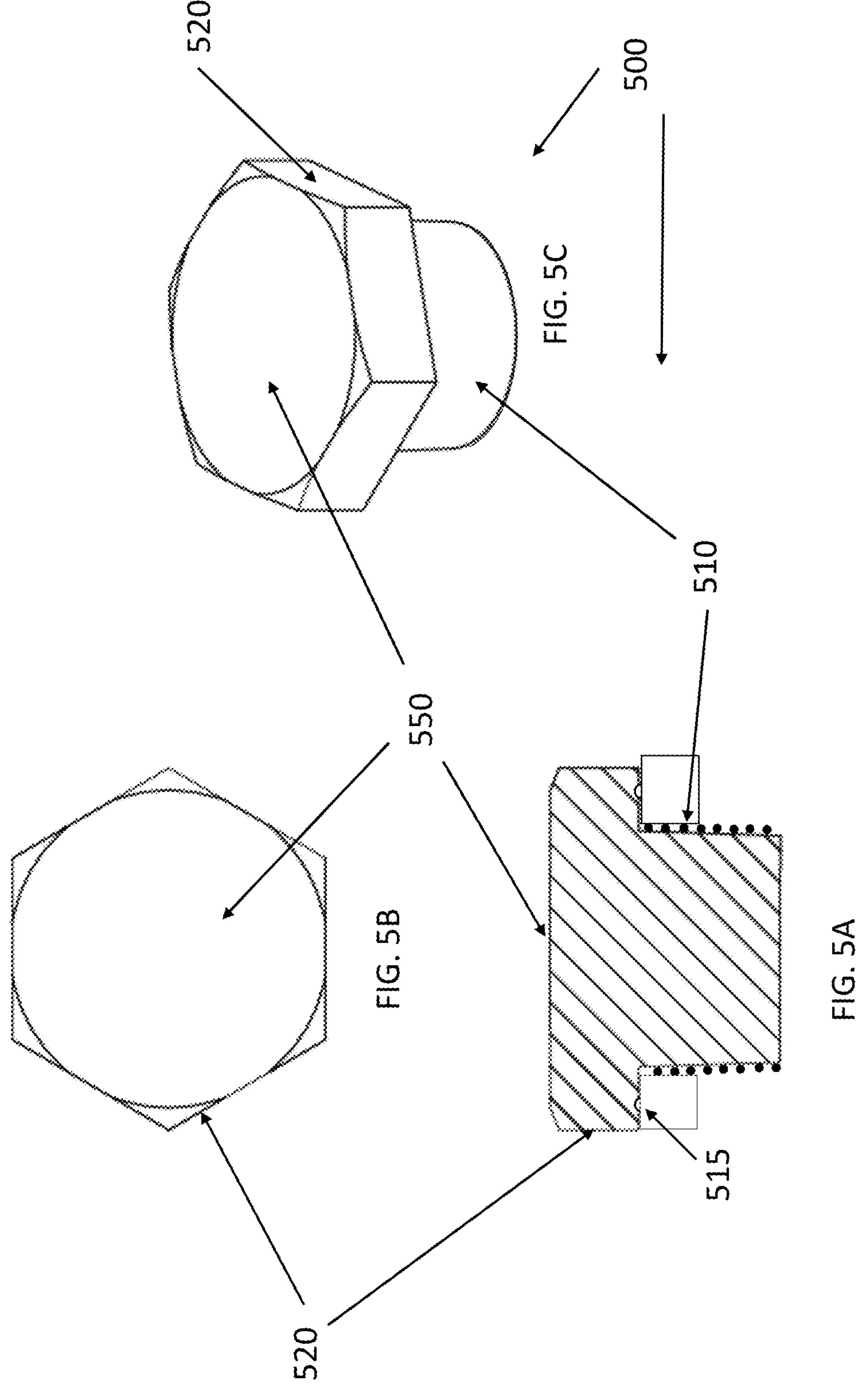
FIG. 5A depicts a cutaway view of an embodiment of an optical process lens.
FIG. 5B depicts a top view of an embodiment of an optical process lens.
FIG. 5C depicts a perspective view of an embodiment of an optical process lens.

500 is the embodiment of the optical process lens shown in FIG. 5A, FIG. 5B and FIG. 5C configured as a bolt.

510 are the threads of the optical process lens embodiment shown in FIG. 5A, FIG. 5B and FIG. 5C.

515 is the gasket cavity of the optical process lens embodiment shown in FIG. 5A, FIG. 5B and FIG. 5C.

520 is the head of the optical process lens embodiment shown in FIG. 5A, FIG. 5B and FIG. 5C.

550 is the viewing portion of the optical process lens embodiment shown in FIG. 5A, FIG. 5B and FIG. 5C.

Figures 6A, 6B, 6C:
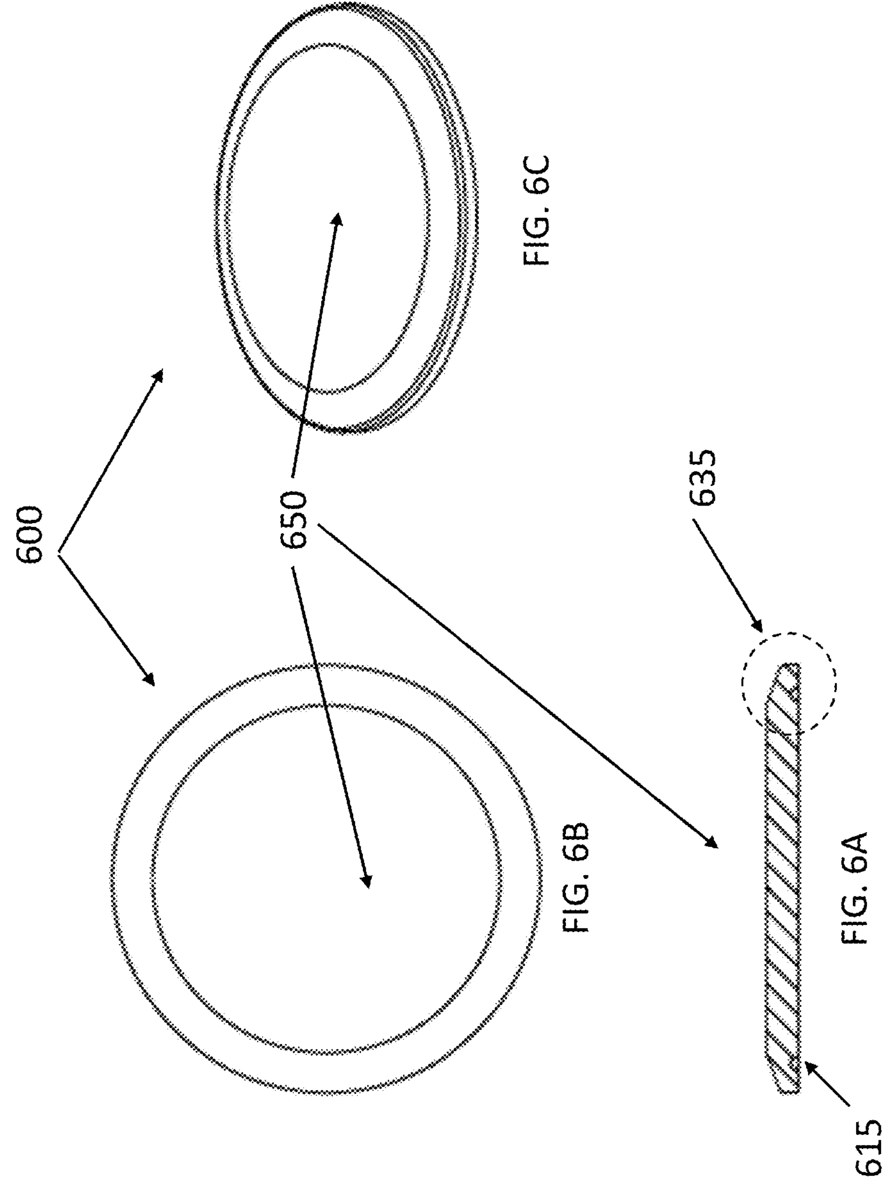
FIG. 6A depicts a cutaway of an embodiment of an optical process lens.
FIG. 6B depicts a top view of an embodiment of an optical process lens.
FIG. 6C depicts a perspective view of an embodiment of an optical process lens.

600 is the embodiment of the optical process lens shown in FIG. 6A, FIG. 6B and FIG. 6C.

615 is the gasket groove of the optical process lens embodiment shown in FIG. 6A, FIG. 6B and FIG. 6C.

635 is the tapered edge, used for clamping, of the optical process lens embodiment shown in FIGS. 6A, 6B and 6C.

650 is the viewing portion of the optical process lens embodiment shown in FIG. 6A, FIG. 6B and FIG. 6C.

Figures 7A, 7B, 7C:
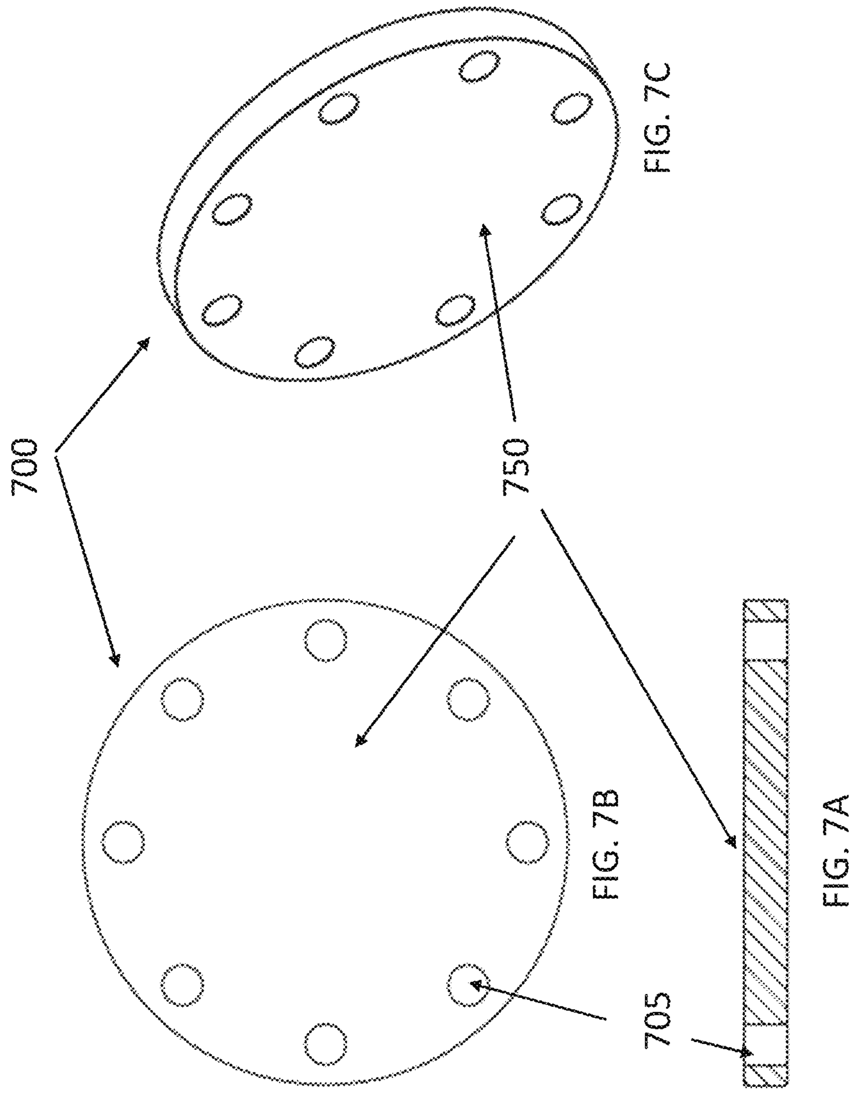
FIG. 7A depicts a cutaway of an embodiment of an optical process lens.
FIG. 7B depicts a top view of an embodiment of an optical process lens.
FIG. 7C depicts a perspective view of an embodiment of an optical process lens.

700 is the embodiment of the optical process lens shown in FIG. 7A, FIG. 7B and FIG. 7C.

705 are the holes of the optical process lens embodiment shown in FIG. 7A, FIG. 7B and FIG. 7C.

750 is the viewing area of the optical process lens embodiment shown in FIG. 7A, FIG. 7B and FIG. 7C.

Figures 8A, 8B:
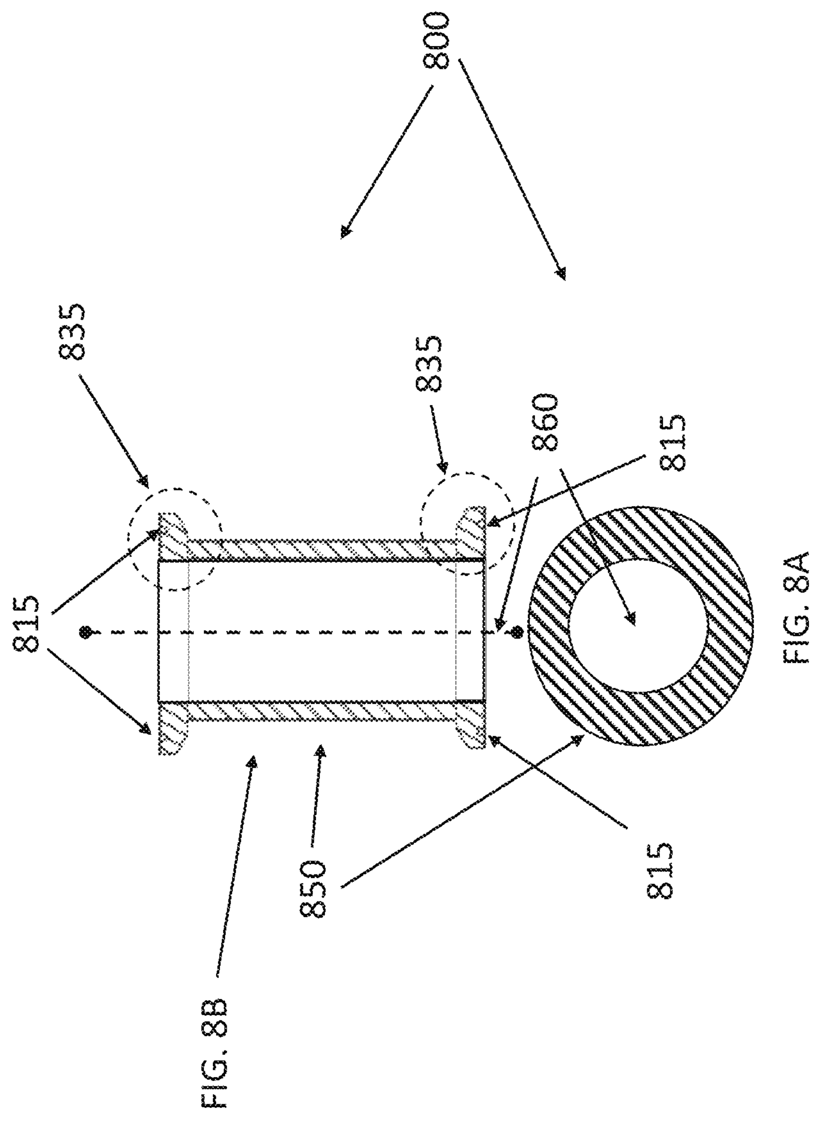
FIG. 8A depicts a top view of an embodiment of an optical process lens.
FIG. 8B depicts a cutaway view of an embodiment of an optical process lens.

800 is the embodiment of the optical process lens shown in FIG. 8A and FIG. 8B.

815 are gasket grooves of the optical process lens embodiment shown in FIG. 8A and FIG. 8B.

835 are flanges with tapered edges used for clamping of the optical process lens embodiment shown in FIG. 8A and FIG. 8B.

850 is the viewing portion of the optical process lens embodiment shown in FIG. 8A and FIG. 8B.

860 is the central axis of the optical process lens embodiment shown in FIG. 8A and FIG. 8B.

Figures 9A, 9B:
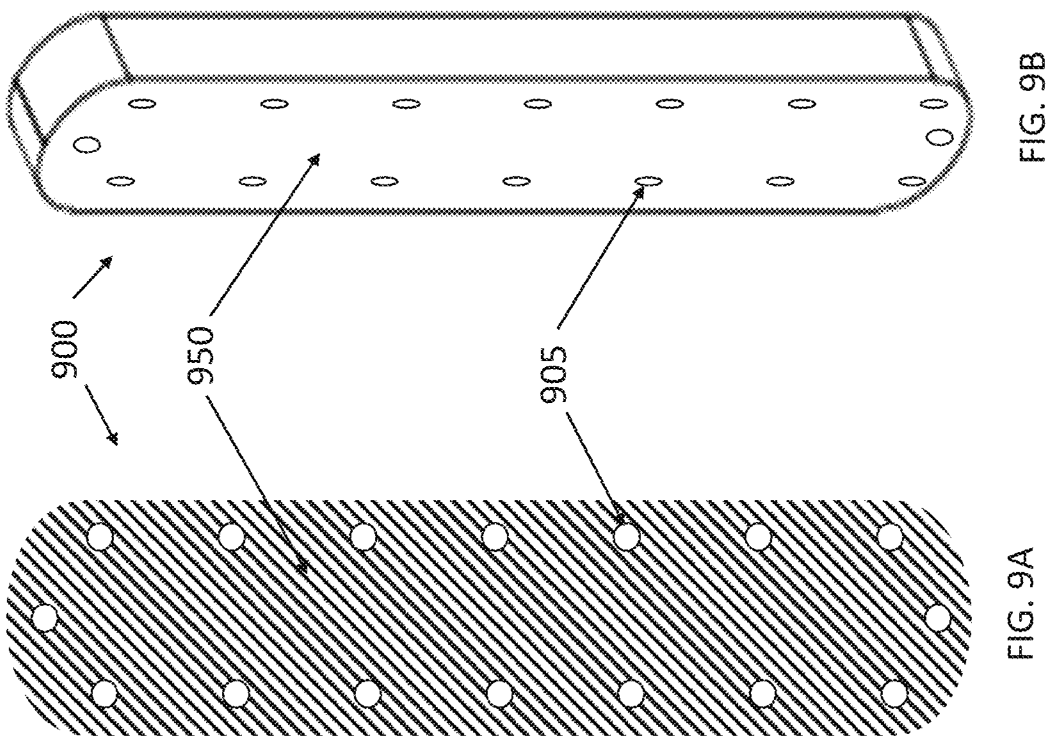
FIG. 9A depicts a cutaway view of an embodiment of an optical process lens.
FIG. 9B depicts a perspective view of an embodiment of an optical process lens.

900 is the embodiment of the optical process lens shown in FIG. 9A and FIG. 9B.

905 are the holes of the optical process lens embodiment shown in FIG. 9A and FIG. 9B.

950 is the viewing portion of the optical process lens embodiment shown in FIG. 9A and FIG. 9B.

It has been discovered that transparent ceramic can be used to replace glass in the prior art optical lens assemblies.

It has been established that frames and fused metal components of current optical process lens assemblies can be eliminated or dramatically changed if the industrial optical process lens is made from a transparent ceramic.

Typical transparent ceramics include, but are not limited to, the group consisting of crystals of metal oxides, such as Aluminum-Oxynitride, Magnesium-Oxynitride, $Al_2O_3$ and MgO.

To be transparent means that at least 50% of a light spectrum can pass through the article from the first side and through the second side. That light spectrum can be selected from the group consisting of visible light (400-700 nm), the infrared spectrum (greater than 700 nm to 1 mm), and the ultraviolet spectrum (10 nm to less than 400 nm). While 50% of the light spectrum is preferred, at least 90% of the light spectrum is more preferred with at least 95% of the light spectrum most preferred.

An optical process lens comprising a transparent ceramic member will have a first side, a second side opposite the first side, and a perimeter. The optical process lens is configured to be attached to at least one piece of process equipment without the use of a frame.

The frame component of an optical process lens assembly is typically a metal that is shaped to receive or surround the perimeter of the optical process lens and is used to mount the lens to the vessel. The frame component is detachable from the lens using a force less than twice the force of gravity. In some instances, the vessel itself contains a cavity for holding the lens. This is not a frame. The frame is used on the other side of the lens to attach/clamp the optical process lens to the vessel. The frame does not independently provide any force on the optical process lens. The frame indirectly provides a force onto the lens such as when a clamp is applied to the frame, or bolts passing through the frame are tightened causing the frame to apply a force to the optical process lens.

The frame should not be confused with a metal that is fused to the optical process lens. These fused metal components cannot be removed from the optical process lens with a force less than twice the force of gravity. The fused metal component can also be avoided when the optical process lens is made from transparent ceramic.

The optical process lens preferably has at least one groove for a sealing gasket.

This invention is to a new type of optical process lens. The optical process lens comprises a transparent ceramic member.

To be transparent, the ceramic member must allow at least 50% of a light spectrum to pass through both the first and second sides of an optical process lens made from the transparent ceramic. The light spectrum is selected from the group consisting of visible light (400-700 nm), the infrared spectrum (greater than 700 nm to 1 mm), and the ultraviolet spectrum (10 nm to less than 400 nm).

The transparent ceramic member will have a first side which is the viewing side denoted as "x" 50, where x is the numerical value of the component, in the FIGS. 5A, 5B, 5C, 6A, 6B, 6C, 7A, 7B, 7C, 8A, 8B, 9A, and 9B.

The side opposite the first side of the optical lens is the second side or process side. The optical lens will have a perimeter. In the case of a simple optical lens shape, which does not have the process media pass through the optical lens, the perimeter is the outer trace of the transparent ceramic member in the plane perpendicular to the line passing through the first side and perpendicular to the second side. The perimeter can be seen in FIGS. 5B, 6B, 7B, and 9A.

The embodiment of FIG. 8 is a complex lens shape defined by the process media passing through the optical lens. In the case of a complex lens shape, the perimeter is the outer trace of optical lens made from the transparent ceramic member in the plane perpendicular to the process medial flow path shown by the line 860.

The optical process lens has a configuration to be attached to at least one piece of process equipment without the use of a frame. The type of configuration can vary.

The embodiment shown in FIGS. 5A, 5B and 5C depicts the transparent ceramic configured as a bolt. This configuration has a first bolt portion and a second bolt portion wherein the first bolt portion is a threaded rod (510), and the second bolt portion is a polygon shaped head (520) with the polygon perpendicular to the threaded rod. This bolt uses the threads (510) on the first bolt portion to screw into a matching thread in the process vessel or process line. This configuration is comparable to FIG. 1 where the lens is fused to a metal component or is inside a frame, but without the metal component fused to the frame.

The embodiment shown in FIGS. 6A, 6B, and 6C is a disk with a tapered or chamfered edge (635). This disk has a circumference, and the configuration comprises a sloped surface tracing the circumference on the first side or the second side to allow for a ring clamp to be applied to the sloped surface. In this embodiment a clamp is used to put pressure directly on the optical process lens to press against a flange on the process vessel that is also chamfered. This is akin to the disk of prior art FIGS. 3A, 3B and 3C, but without the metal frame.

The embodiment 700 shown in FIGS. 7A, 7B, and 7C is a flat disk configured with at least four holes (705) passing through the first and second side for threaded rods attached to the process vessel or process line to pass through the transparent ceramic disk. Nuts are then placed on the threaded rods to tighten the disk to the process vessel or line. The prior art embodiment is 200 in prior art FIGS. 2A and 2B. Alternatively, the bolts can be threaded into holes in the vessel, typically at a flange.

Embodiment 800 shown in FIGS. 8A and 8B is configured in the shape of a tube with a process hole passing through a first tube end and a second tube end. The first side is on the outside of the tube and the second side is on the inside of the tube. The first end and second end have the configuration of a flange that is perpendicular to the hole. In the prior art, not shown, the tube is part of a complex assembly inside a metal frame. However, it is believed that the transparent ceramic can be shaped as shown in FIGS. 8A and 8B and configured with the chamfered flanges (835) to attach directly to flanges of a process line via a clamp. Again, no frame or fused metal is needed.

Alternatively, instead of the clamp, bolts and nuts can be used to join the optical process lens (800) with flanges.

Embodiment 900 shown in FIGS. 9A and 9B is configured with holes (905) for threaded rods attached to the process vessel or process line to pass through the transparent ceramic member. Again, bolts could be used and threaded into holes tapped holes The elegance of this solution can be seen by comparing it with the prior art frame and lens assembly 400 shown in FIGS. 4A and 4B.

In addition, it is conceived that the transparent ceramic can be present in the assembly as a thin layer abutting, or laying against a non-ceramic transparent material, such as glass on either the process side and/or the viewing side of the optical process lens.

Optical process lenses having the configuration of the embodiments in FIGS. 7A, 7B, and 7C with only 4 holes were made to evaluate the ability to drill the aluminum-oxynitride material.

Optical process lenses having the chamfered configuration of the embodiments in FIGS. 6A, 6B, and 6C were made to evaluate the ability to grind and polish the aluminum-oxynitride material into the desired shape.

What is claimed is:

1. An optical process lens consisting of a transparent ceramic member having a first side, a second side opposite the first side, and a perimeter; with the optical process lens having a configuration to be attached to at least one piece of process equipment without the use of a frame, wherein the optical process lens is a disk having a circumference and the configuration comprises a sloped surface (chamfer) tracing the circumference on the first side or the second side to allow for a ring clamp to be applied to the sloped surface.

2. An optical process lens consisting of a transparent ceramic member having a first side, a second side opposite the first side, and a perimeter; with the optical process lens having a configuration to be attached to at least one piece of process equipment without the use of a frame, wherein the optical process lens is in the shape of a tube with a process hole passing from a first tube end through a second tube end where the first side is on an outside of the tube and the second side is on an inside of the tube and the first end and second end have the configuration of a flange that is perpendicular to the hole.

3. An optical process lens consisting of a transparent ceramic member having a first side, a second side opposite the first side, and a perimeter; with the optical process lens having a configuration to be attached to at least one piece of process equipment without the use of a frame, wherein the optical process lens is in the shape of a bolt with a first bolt portion and a second bolt portion wherein the first bolt portion is a threaded rod, and the second bolt portion is a polygon shaped head with the polygon perpendicular to the threaded rod.

* * * * *